W. L. THOMAS.
APPARATUS FOR THE TREATMENT OF SMOKE FROM FURNACES AND THE LIKE.
APPLICATION FILED DEC. 11, 1911.
1,082,245. Patented Dec. 23, 1913.
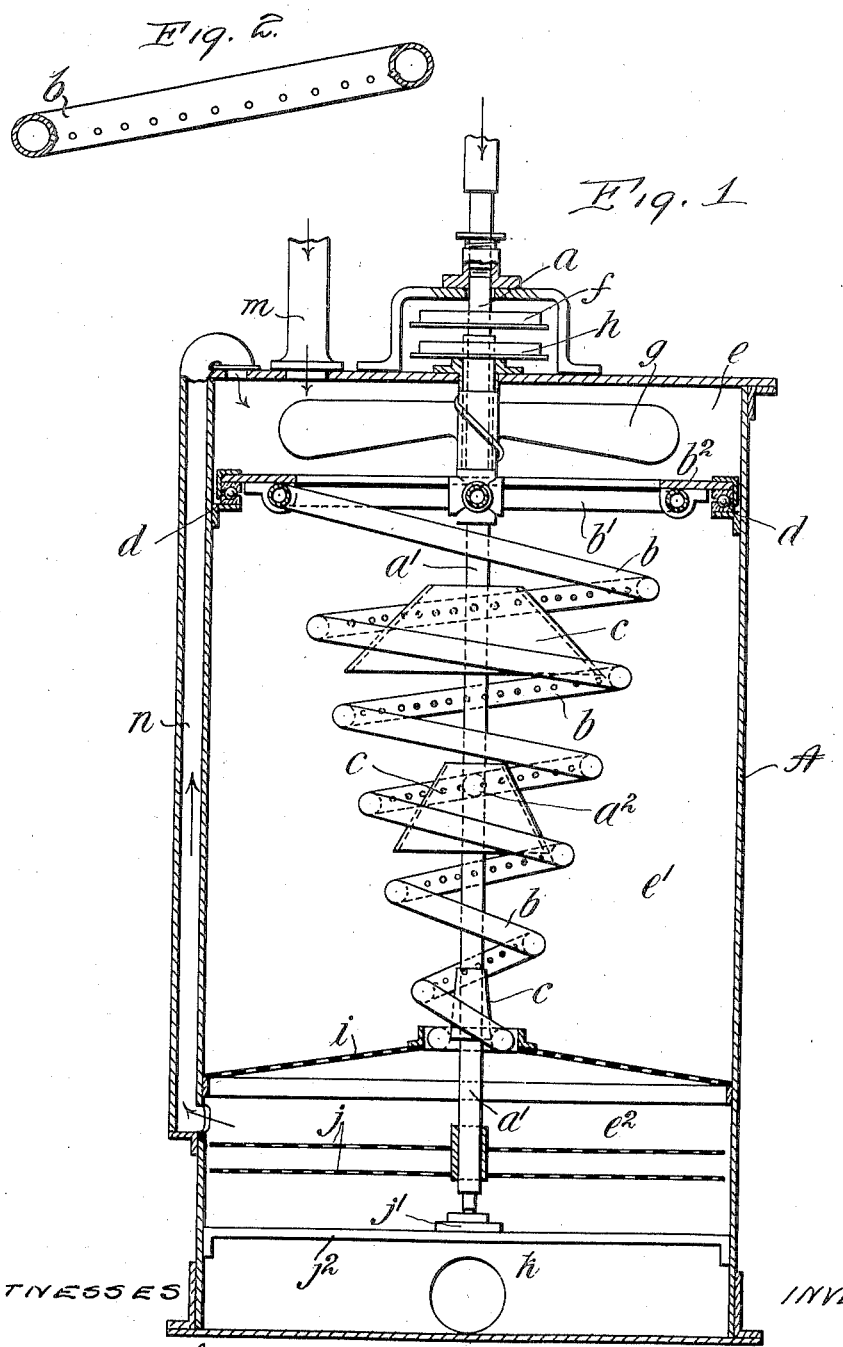

UNITED STATES PATENT OFFICE.

WILLIAM LLEWELYN THOMAS, OF WHEATLEY, ENGLAND, ASSIGNOR TO THE SMOKE ELIMINATOR SYNDICATE LIMITED, OF LONDON, ENGLAND.

APPARATUS FOR THE TREATMENT OF SMOKE FROM FURNACES AND THE LIKE.

1,082,245.     Specification of Letters Patent.     Patented Dec. 23, 1913.

Application filed December 11, 1911. Serial No. 665,121.

*To all whom it may concern:*

Be it known that I, WILLIAM LLEWELYN THOMAS, a subject of the King of Great Britain and Ireland, and resident of Wheatley, in the county of Oxford, England, have invented certain new and useful Improvements in Apparatus for the Treatment of Smoke from Furnaces and the like, of which the following is a specification.

This invention relates to apparatus for removing smoke and solid particles from the products of combustion from hearths, furnaces and the like, and more particularly to that class of such apparatus in which the smoke is passed through a chamber and subjected to the action of a continuous spray of water.

According to this invention the products of combustion are passed downward through a vertical chamber in which is mounted the spraying device. The device consists of a perforated pipe coiled into a conical spiral and mounted upon a central vertical spindle by means of which it is rotated upon its long axis. The products of combustion are led into the open base of the coil and are caused by means of baffles to be projected outwardly through the interstices of the coil. When the coil is at rest the water passing through the pipe passes through the perforations and descends and falls vertically to the perforated floor of the apparatus. The streams of water issuing from the spiral pipe will form a helical surface which, when revolved in one direction, would force the smoke downward in the direction of the pitch of the helix. Perforated plates are arranged at the base of the apparatus so as to cause the more effectual action of the water. A fan is provided near the enlarged portion of the coil for the purpose of inducing a draft when the apparatus is started up, but I have found that when a draft has been established the fan may be stopped, the revolution of the coil and the flow of the water being sufficient to maintain the steady passage of the products of combustion.

Referring to the drawings:—Figure 1 designates a vertical sectional view, showing the coil in elevation. Fig. 2 is an enlarged detail sectional view of the pipe coil showing the direction of the perforations relative to the axis of the coil.

Similar reference letters denote corresponding parts in the several figures.

The accompanying drawing in which A refers to the casing illustrates a practical method of carrying out the invention.

Suspended from the lower end of a hollow and rotatable pipe $a$ and connected therewith is a hollow perforated downwardly extending converging coil $b$ having arranged within its turns and secured thereto and to a centrally depending pipe $a'$ in any suitable manner a series of hollow frusto-conical baffle cones $c$ that converge upwardly and vary in size. The pipe $a'$ forms a continuation of the pipe $a$ and has a connection by a branch pipe $a^2$ at one of the cones $c$ with said pipe $a'$ as shown, to further feed the coil $b$, the pipe $a$ having at its lower end a bearing $j'$ carried by a bridge piece $j^2$. The hollow and unperforated pipe $b'$ carrying this coil, which by its upper end is mounted on a ball bearing race $d$ arranged within and near the top of a closed chamber or tank $e$, is rotated in one direction by any suitable means, for instance by a pulley $f$, while a fan $g$ loosely mounted on said hollow pipe $a$ which acts as a shaft above the coil and below the top of the tank $e$ is rotated by any suitable means, as by pulley $h$.

Located at the lower end of the coil is a fixed perforated plate $i$ dividing the closed chamber $e$ into two parts or chambers $e'$, $e^2$, the bottom of the lower part being formed by gauze diaphragms $j$, fixed to the pipe $a'$ so as to rotate therewith, which lead to a discharging chamber or tank $k$, and from near the bottom of the lower chamber $e^2$ there is a by-pass $n$ leading to the top of the upper chamber $e'$.

In operation, water is fed in any suitable manner to the hollow and rotatable pipe $a$, $a'$ and issues through the perforations in the spiral $b$, which perforations are preferably inclined inward and downward toward the central axis of the coil, while smoke is exhausted from the furnace or the like through a suitable intake $m$ connected to the upper or exhaust chamber into said chamber by means of the action of the rotating coil and the fan $g$, said smoke passing through the opening in the bearer plate $b^2$ of the pipe $b'$. In practice it is found that the use of said fan is only required when first firing the furnaces and the like takes place, in other words to assist in producing a forced draft, the suction caused by the continuous falling of the helical spray of water thrown from the revolving coil being sufficient to effect the exhaust and movement of the smoke.

The smoke after passing through the central opening in the bearer plate is directed into the base of the coil; part of the smoke passes through the top of the hollow cone or baffle $c$ downward on to the outer surface of the next and lower cone or baffle $c$; the other part of the smoke strikes against the outer surface of the top hollow cone or baffle $c$ and is thrown outward and toward the revolving coil $b$, these actions taking place with each succeeding cone or baffle. The smoke thus thrown outward meets with the water given off by the coil and is washed or broken up thereby. The said smoke or gases are further cleansed by contact and intermingling with the helical surface of water that has previously been referred to in the specification. They are then forced down onto the perforated plate $i$, and thence to a second chamber $e^2$, where they are partially collected or retarded and carried back by the by-pass $n$ to the exhaust chamber $e'$ for further treatment by the water thrown off by the coil. The unconsumed particles and unabsorbed washed gases held by the water finally pass from the collecting chamber $e^2$ on to the beforementioned diaphragms $j$ and thence into the tank $k$ and from thence to waste, or the water may be returned to the tank and if filtered may be returned to the boilers (as feed water) thus economizing, or the heated water may be returned for other purposes, the unconsumed carbon and any by-products being used or dealt with as required.

Having now described my invention what I claim as new and desire to secure by Letters Patent of the United States is:—

1. An apparatus of the class described, comprising a casing having a gas inlet, a main discharging chamber, and an intermediately located gas-collecting chamber, a by-pass connection providing communication between the said gas-collecting chamber and the gas inlet end of the casing, means for producing a continuous revolving spray within the casing, and means for forcing the incoming gases through said spray.

2. A smoke consumer comprising a casing having a gas inlet, a main discharging chamber, and an intermediately located gas-collecting and retarding chamber, a water supply connection, a vertical hollow pipe shaft in communication with the water supply connection, a helical coil of perforated tubing rotatably mounted in the casing and in communication with the said hollow pipe shaft, baffles located in the coil, a by-pass connecting the collecting and retarding chamber and the top part of the casing, a fan loosely mounted on said vertical pipe shaft, and means on the fan and pipe shaft for operating them.

3. An apparatus of the class described, comprising a casing having a gas inlet at one end, a main discharging chamber at its opposite end, and an intermediately located gas-collecting and retarding chamber, a water supply connection, a hollow vertical pipe shaft journaled in the casing and in communication with the water supply connection, a convergent helical coil of perforated tubing carried by and in communication with the hollow pipe shaft, a fan loosely mounted on the pipe shaft within the gas-receiving end of the casing, conical baffles arranged inside of the said coil, perforated diaphragms secured to the said shaft above the main discharging chamber, a perforated plate fitted to the casing above the diaphragms and combining with the latter to form the said gas-collecting chamber, a by-pass connection providing communication between the said gas-collecting chamber and the gas-receiving end of the casing, and means for respectively rotating the shaft and the said fan.

In testimony whereof I have affixed my signature in presence of two witnesses.

WILLIAM LLEWELYN THOMAS.

Witnesses:
 ROBT. HUNTER,
 E. C. AXE.